US006188560B1

(12) United States Patent
Waas

(10) Patent No.: US 6,188,560 B1
(45) **Date of Patent: *Feb. 13, 2001**

(54) MULTI-WIRE TERMINAL BLOCK EMPLOYING REMOVABLE SURGE PROTECTOR

(75) Inventor: Charles W. Waas, Huntington Beach, CA (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/817,249

(22) PCT Filed: Sep. 29, 1995

(86) PCT No.: PCT/US95/12745

§ 371 Date: Apr. 18, 1997

§ 102(e) Date: Apr. 18, 1997

(87) PCT Pub. No.: WO96/13089

PCT Pub. Date: May 2, 1996

Related U.S. Application Data

(63) Continuation-in-part of application No. PCT/US94/11908, filed on Oct. 21, 1994.

(51) Int. Cl.[7] ........ H02H 1/04

(52) U.S. Cl. ........ 361/119; 439/412; 439/709

(58) Field of Search ........ 361/111, 112, 361/117, 118, 119, 126, 127, 728, 823, 824; 174/51, 52.1, 52.2; 439/95, 97, 108, 389, 391, 409–413, 572, 709

(56) References Cited

U.S. PATENT DOCUMENTS

| | | | |
|---|---|---|---|
| 4,288,832 | 9/1981 | Saligny | 361/119 |
| 4,420,792 | 12/1983 | Hegner et al. | 361/331 |

(List continued on next page.)

FOREIGN PATENT DOCUMENTS

| | | | |
|---|---|---|---|
| 0 711 012 A1 | 5/1996 | (EP) | H01T/4/06 |
| WO 94/18722 | 8/1994 | (WO) | H01R/9/26 |

OTHER PUBLICATIONS

"Terminal Systems for the 90's . . . and Beyond", by PSI Telecom, May 1994.

*Primary Examiner*—Ronald W. Leja
(74) *Attorney, Agent, or Firm*—John A. Fortkort

(57) ABSTRACT

A protected terminal block has a housing (10) having a plurality of test ports (18) and a plurality of electrical contact elements (40), each of which includes a test lead (48) which is accessible through a test port (18). The electrical contact elements are configured in the housing and connected to an exchange wire which is secured to a stub cable. A protection module retainer (140) is secured to a side of the housing (10) proximate the test ports (18) to form a plurality of retaining cups (142) adapted to receive a protection module (100). A grounding strip (150) is secured to ground and retained between the protection module retainer (140) and the housing (10) proximate the test ports (18), the grounding strip (150) having a plurality of integral ground connectors (158). A protection module (100) is provided having a protector (116) which is connected to a pair of terminal block contact elements (102) and a ground connector (160). When inserted into a retaining cup (142), the terminal block contact elements (102) engage a pair of corresponding test leads (48) in test ports and the protection module ground connector (160) engages the grounding strip ground connector (158) to provide surge protection to a pair of conductive paths through the connection of the test leads in the test ports. The protection module may be removed or replaced as needed.

21 Claims, 6 Drawing Sheets

U.S. PATENT DOCUMENTS

| | | | |
|---|---|---|---|
| 4,424,546 | 1/1984 | Smith | 361/119 |
| 4,876,621 | 10/1989 | Rust et al. | 361/58 |
| 4,901,189 | 2/1990 | Merriman et al. | 361/119 |
| 4,924,345 | 5/1990 | Siemon et al. | 361/111 |
| 5,149,278 | 9/1992 | Waas et al. | 439/412 |
| 5,175,662 | 12/1992 | DeBalko et al. | 361/119 |
| 5,224,013 | 6/1993 | Pagliuca | 361/119 |
| 5,260,994 | 11/1993 | Suffi | 379/399 |
| 5,296,646 | 3/1994 | Capper et al. | 361/119 |
| 5,365,660 | 11/1994 | Capper et al. | 361/119 |
| 5,435,747 | 7/1995 | Franckx et al. | 439/409 |
| 5,557,250 * | 9/1996 | Debbaut et al. | 361/124 |

* cited by examiner

MULTI-WIRE TERMINAL BLOCK EMPLOYING REMOVABLE SURGE PROTECTOR

This application is filed under 35 USC 371 of PCT/US95/12745 which was filed on Sep. 29, 1995, and is a continuation-in-part of PCT/US94/11908 which in turn was filed on Oct. 21, 1994.

BACKGROUND

1. Field of the Invention

The present invention relates to telecommunications terminal blocks such as terminal blocks for connecting telephone service wires to telephone exchange distribution cables. More particularly, the present invention relates to providing electrical surge protection for telecommunications terminal blocks.

2. Description of Related Art

Telecommunications terminal blocks are used to provide convenient electrical connections between telephone customer service wires, or drop wires, (the "service" side) and telephone exchange distribution cables (the "exchange" side). Such terminal blocks typically connect up to 50 distribution cable wire pairs on the exchange side, which may have several thousand wire pairs, to up to 50 corresponding service wire pairs on the service side. Terminal blocks generally are configured as standard, multi-wire units which terminate either 3, 5, 10, 12, 15, 25 or 50 wire pairs.

The exchange side of the terminal block is connected to the exchange wires of the distribution cable through a stub cable. One end of the stub cable is typically connected to the exchange side of the terminal block within the terminal block. The other end of the stub cable is connected to selected wire pairs from the distribution cable. The permanent connection between the stub cable and the exchange side of the terminal block may be potted or provided within a chamber which seals the exchange side from the environment and provides a physically robust connection to withstand the recurring installing and removing of connections on the service side.

The service side of a terminal block is used to removably connect service wires to the distribution cable, through the permanent connection for the terminal block, so as to allow later disconnection and reconnection. Service wire pairs are typically connected to the terminal block through some type of terminal which is easy to connect and disconnect on-site such as a simple binding post where a stripped service wire is connected to the binding post and then secured with some type of cap. Another common type of terminal is an insulation displacement terminal where the service wire need not be bared prior to the connection to the terminal block and the insulation is severed through a blade or other sharp surface as the service wire is secured to the terminal. Again, in the insulation displacement type of terminal, some type of cap is typically employed to secure the service wire in place.

While the caps typically employed in the binding post or insulation displacement type terminals provide some protection from the environment, nonetheless, moisture, pollutants, chemicals, dust and even insects may reach the terminal connection resulting in corrosion or other degradation of the contact. This problem is exacerbated by the fact that in addition to the traditional aerial location of such terminal blocks, underground and even underwater terminal block locations are more and more frequently required for telephone distribution applications. Accordingly, efforts have been made to better insulate the terminal in the terminal block from the environment to prevent such degradation. One such approach has been to use a variety of insulating mediums, such as greases or gels to surround the terminal where the electrical connection is made.

Protecting telecommunications equipment against current and voltage surges is well known. Conventionally, the protection systems have been designed to resist major surges, e.g. due to lightning strikes or accidental connection to high voltage sources. Typically, protection provided for telecommunications lines is comparatively large and unwieldy, and therefore provided as a stand-alone package which is installed in concert with the lines to be protected. Due to their size, many of these systems are limited to protecting individual lines in areas without space restrictions such as telephone central offices or corporate offices which have adequate room to house individual protection for each line. Protection systems in this environment typically used gas tubes and, more recently, solid state devices to provide protection.

Increasingly, telecommunications terminal blocks connect service applications having sensitive electronic equipment, such as computers, directly to the telecommunication lines. As a result, protection against surges smaller than lightning strikes is needed. Such smaller surges may occur virtually anywhere along a system and hence more individualized protection for each line is needed.

Terminal blocks are available which provide protection in addition to terminating service wires to exchange wires. A prior art telecommunications terminal block, of the binding post variety, provides protection by providing a substantially larger terminal block which includes separate protection circuits. Each binding post which is used for service wire connections is connected to a corresponding screw-in type protector secured within a threaded protection retainer adapted to receive the screw-in protector. A protector may be added as needed to provide protection to a particular line or to permit replacement of a protector.

The prior art terminal block, as described above, is larger than a typical terminal block because it must provide the required room for the protection circuits. Moreover, as a binding post type terminal block, limited protection is provided against the environment. Due to the substantial space required and the limited protection against the environment, this prior art protected terminal block may be inadequate for installations where exposure to the environment can be expected or where terminal block space is limited.

Terminal blocks undergo extensive development and field testing prior to use in the field to ensure a particular design is capable of withstanding the difficult environmental and operational challenges inherent in terminal block use. As a result, users tend to be faithful to terminal block designs which have proven themselves rugged and reliable over time. With the advent of an increasing need for protection in terminal blocks, it would be desirable to be able to add protection using existing terminal block designs without requiring extensive redesign. Extensive redesign requires additional testing, new tooling and, in the mind of the user, could call into question the terminal block's environmental or operational integrity.

Another issue which is raised in providing protection is related to how often line protection is needed. In some applications every line connected to a particular terminal block may need to be protected. Protecting a specific line can be costly, however, due to the components involved in providing protection. Therefore, in some cases a particular user may decide that certain lines do not require protection or are not worth the cost of protection in view of the probability that a voltage surge may occur. As a result, it is desirable that a protected terminal block be provided in which the user has the option to determine which lines may need protection and add protection to those lines. Further, it is desirable to permit the user to either add or remove the protection, as the used of the lines involved changes.

For the foregoing reasons, there is a need for an improved telecommunications terminal block having protection against electrical surges.

SUMMARY OF THE INVENTION

The present invention is directed to an apparatus and method that satisfies the above noted needs.

In accordance with a preferred embodiment, the protected terminal block in accordance with the present invention comprises a housing having a test port, an access hole for allowing a wire to be inserted into the housing, and an electrical contact element having a test lead, the electrical contact element configured in the housing and conductively connected to an exchange wire. The test port provides access to the test lead from outside the housing. The present invention includes a means configured within the housing for electrically connecting a service wire to a contact element. A ground contact and a receptacle are provided which are secured to the housing. The receptacle is attached to the housing adjacent a test port. The present invention also includes means, removably mounted in the receptacle and extending into the test port, for protecting a selected electrically conductive path. The means for protecting is connected to the ground contact and the test lead.

The receptacle of the present invention may be provided as a protection module retainer. The protection module retainer is secured to a side of the housing proximate the test ports to form a plurality of retaining cups adapted to receive the protection module. The means for protecting a selected electrically conductive path may be provided as a protection module which includes a protector conductively connected to a protection module ground connector and a pair of terminal block contact elements. The protection module may employ any of the protectors known in the art including a gas discharge tube protector; a solid state protector; or a hybrid solid state and gas discharge tube protector, depending on the specific equipment to be protected.

The present invention also includes a ground contact secured to the housing. In a preferred embodiment the ground contact may be provided as a grounding strip conductively secured to ground and retained between the protection module retainer and the housing proximate the test ports, the grounding strip having integrally formed therein a plurality of ground connectors.

When inserted into a retaining cup, the protection module ground connector is conductively connected to the ground contact, providing a path to ground for the protector. The terminal block contact elements are inserted into a pair of test ports, providing a connection between a corresponding pair of test leads and the protector. Therefore, when installed in a retaining cup, a protector provides surge protection to a pair of conductive paths through the connection of the test leads in the test ports. The retainer ensures the protection module is secured in place and properly aligned with the ground connectors of the grounding strip. The protection module may be removed if worn out or exposed to excessive voltage surge and protection modules may be used sparingly to save money by only protecting conductive paths where necessary.

In another embodiment, the present invention may further comprise a chamber within the housing and the means for electrically connecting a service wire to a contact element comprises a wire carrier member configured in the housing, the wire carrier member having an opening for receiving a wire inserted through the access hole and being movable within the housing so as to move a service wire engaged thereby into contact with the electrical contact element to form an electrically conductive path; and an actuator mechanism, coupled to the wire carrier member and adapted to move the wire carrier member within the housing and relative to the actuator mechanism in a manner such that the actuator mechanism does not change its degree of entry into the housing. Each electrical contact element may be provided as a metal element configured outside the chamber and having a test lead extending into the test port, and a pair of slotted insulation cutting blades extending into the chamber toward the wire carrier member.

In another aspect, the present invention provides a method for adding protection to a terminal block. The method is adapted for use with a terminal block having a housing having a plurality of separate chambers, a plurality of holes for allowing service wire pairs to be inserted into the chambers, and a test port having a test lead connected to the conductive path between the service wire and the exchange wire. In a preferred embodiment, the method for protecting a terminal block comprises securing a ground contact to the side of the housing of the terminal block proximate the test ports of the terminal block. A protection module retainer is secured to a side of the housing proximate the test ports to form a plurality of retaining cups adapted to removably receive a protection module. Preferably, the ground contact may be retained between the protection module retainer and the housing. A protection module having a protector with a terminal block contact element and a protection module ground connector is inserted within a selected retaining cup corresponding to a selected electrically conductive path to be protected, so as to form an electrically conductive connection between the terminal block contact element and the test lead, and to form an electrically conductive connection between the protection module ground connector and the ground contact.

In accordance with an alternate embodiment, the protected multi-wire terminal block in accordance with the present invention comprises a housing having a plurality of separate chambers and a plurality of access holes for allowing service wire pairs to be inserted into the chambers. A plurality of electrical contact elements are respectively configured in each of the plurality of separate chambers and conductively connected to an exchange wire. A means for electrically connecting each respective service wire to an electrical contact element is configured within the housing and a ground contact is secured to the housing. A plurality of receptacles is attached to the housing and a means, removably mounted in a selected receptacle and conductively connected to said ground contact and a selected contact element, is provided for electrical surge protection, wherein a protected electrical path is provided between said service wire, said selected electrical contact element and said exchange wire.

In an alternate embodiment, the electrical contact element has an insulation displacement connector, and the means for electrically connecting a service wire to a contact element comprises a wire carrier member configured in the chamber, the wire carrier member having an opening for receiving a wire inserted through the access hole and being movable within the chamber so as to move a service wire engaged thereby into contact with the insulation displacement connector to form an electrically conductive path; and an actuator mechanism, coupled to the wire carrier member and adapted to move the wire carrier member within the chamber and relative to the actuator mechanism in a manner such that the actuator mechanism does not change its degree of entry into the chamber.

A more complete understanding of the present invention will be afforded to those of ordinary skill in the art, as well as a realization of additional advantages and objects thereof, by a consideration of the following detailed description of the preferred embodiment. Reference will be made to the appended sheets of drawings which will first be described briefly.

DETAILED DESCRIPTION

Figure 1:
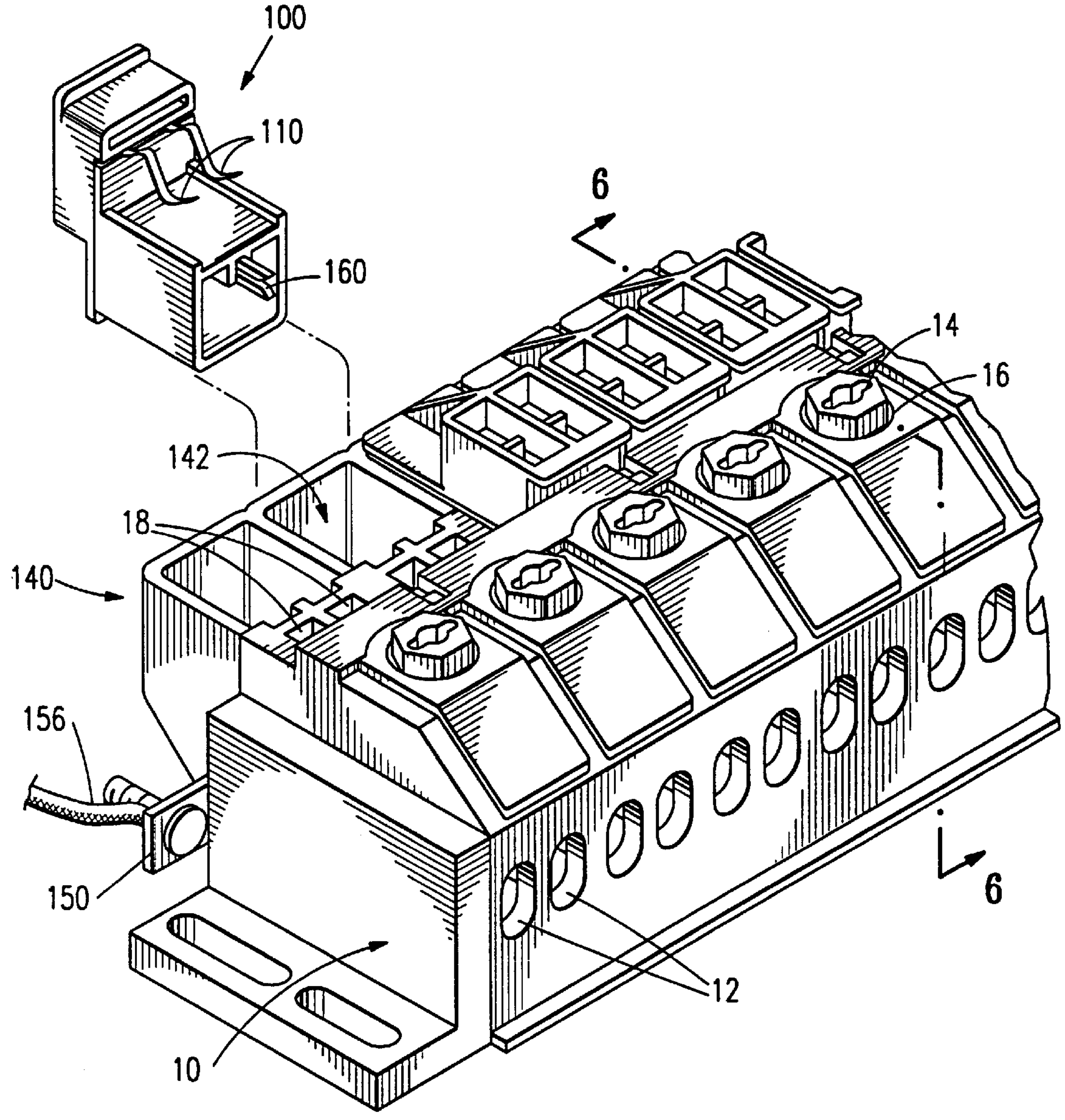
FIG. 1 is a first perspective view of a preferred embodiment of the terminal block of the present invention showing a detached protection module.

A detailed description of the present invention will now be presented in conjunction with the embodiment of the present invention illustrated in FIGS. 1–6, wherein like reference numbers refer to like elements. While the embodiment illustrated in FIGS. 1–6 is a preferred embodiment, it is to be understood that the present invention is in no way limited to the embodiment shown in the drawings.

Figure 2:
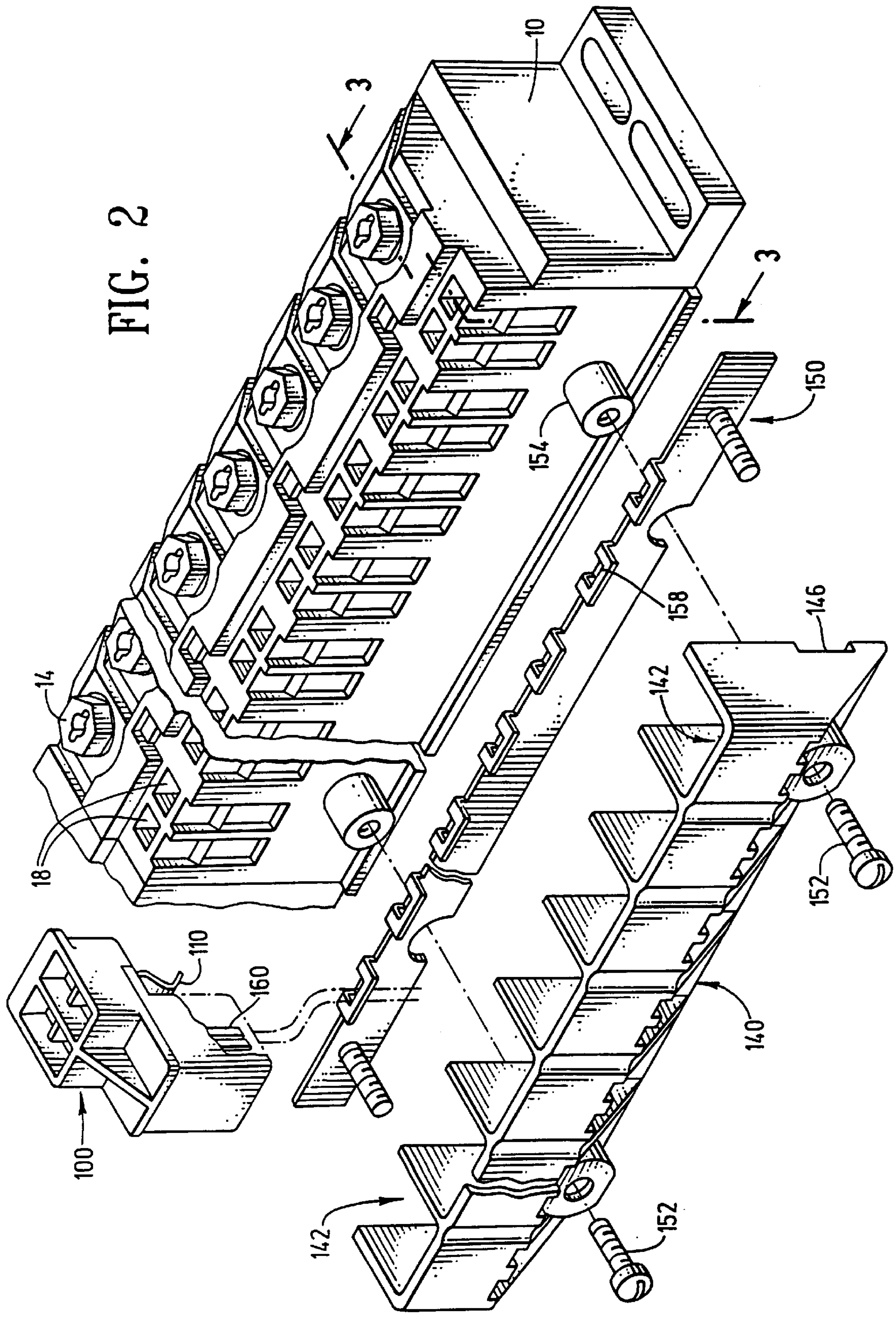
FIG. 2 is a second perspective view of a preferred embodiment of the terminal block of the present invention showing an exploded view of the protection module retainer of the present invention.

A surge protected telecommunications terminal block in accordance with a preferred embodiment of the present invention is shown in FIGS. 1 and 2. Referring to FIG. 1 a first perspective view of a telecommunications terminal block is illustrated showing a single detached protection module 100 for ease of illustration. Any number of protection modules 100 may be employed, up to the total number of connections of the terminal block, allowing flexibility for the specific application.

Prior to describing the protection system a preferred embodiment of the unprotected terminal block will first be discussed. Any of a variety of other terminal block designs may be equally employed however. As illustrated, the terminal block employs an elongated housing 10 having a plurality of wire pair openings 12 along a front surface thereof. The housing 10 is composed of a dielectric material, suitable for manufacture in the desired shape. For example, any one of several commercially available thermoplastic resins may be readily employed due to their relatively low cost and ease of manufacture. Other dielectric materials may be also employed, however.

As shown in FIG. 1, the wire pair openings 12 are spaced apart along the length direction of the housing 10 and, as will be discussed in more detail below, provide access to service wires into isolated internal chambers within the housing 10. The number of pairs of the wire openings 12 thus corresponds to the number of internal chambers and will vary with the specific application of the terminal block. In conventional U.S. telecommunications applications for providing service wire drop connections to telephone distribution cables, 2 to 50 pairs of service wires are typically connected by a single terminal block. Other applications may require different numbers of wire pairs, however. Also, for other types of applications, a single wire opening instead of a pair of openings 12 may be employed for each chamber, or additional wire openings could be provided into each chamber if a need arose in a specific application. Accordingly, the configuration of openings and their spacing along the housing 10 is an illustrative embodiment only and may be varied with the specific application as needed.

Still referring to FIG. 1, arrayed along the top of the housing 10 are a series of terminal actuators 14 equal in number to the number of chambers contained within the housing 10 and respectively positioned over each such isolated chamber. Shown in FIG. 1 are the top portions of terminal actuators 14 and, as will be discussed in more detail below, the remainder of each actuator extends through the housing 10 into each respective chamber. The actuators 14 are inserted into the interior of the housing 10 through matching openings 16 in the housing 10. Terminal actuators 14 are preferably made of a dielectric material which may be the same as the housing 10. The top of the terminal actuator 14 preferably has a shape which may be readily engaged and turned by a hand held wrench or other implement. Alternatively, actuator 14 may be adapted to be grasped and turned by a user of the terminal block. Turning the actuator a fixed amount, preferably indicated by visual markings on the housing and actuator, effects the connection of the service wires to the stub cable in a manner to be discussed in more detail below.

As further illustrated in FIGS. 1 and 2, the housing 10 also has a pair of test ports 18 for each internal chamber. These test ports 18 provide ready access to test leads (not shown) which are conductively connected to the terminations located within the housing 10. Thus the test ports 18 permit testing of the conductive path formed by the termination of the service wires and the exchange wires without opening the housing 10 or disconnecting the service wires.

A pair of housing bosses 154 are provided on the external side of the housing 10 proximate the test ports 18. The housing bosses 154 may be provided as raised cylindrical elements integrally formed with the housing 10 and formed of the same material as the housing 10. The housing bosses 154 are also adapted to receive the bolts 152 which are used to secure the protection module retainer 140 to the side of the terminal block housing 10. The term "bolt" is used herein in a broad sense to include any female/male connector where some turning motion is involved, and includes screws and cams. The housing bosses 154 ensure proper alignment of the grounding strip 150 and the elements secured thereto, as will be described further below.

Surge protection for a telecommunications terminal block in accordance with a preferred embodiment of the present invention is provided with an add-on protection module 100, a protection module retainer 140 and a grounding strip 150.

The grounding strip 150 is provided as an electrically conductive bar. The grounding strip 150 may be manufactured from steel or aluminum or any other suitably conductive material. The grounding strip 150 is retained proximate the housing bosses 154 along the side of the housing 10 by securing the grounding strip between the protection module retainer 140 and the side of the housing 10. Preferably, the grounding strip includes semi-circular cut-outs which permit the grounding strip to rest on top of the housing bosses 154. At least one point of the grounding strip 150 is attached to ground, using an electrically conductive connection, through a grounding cable 156 which may be provided as a wire mesh cable or other electrically conductive cable as is known in the art to conductively connect telecommunications terminal blocks to ground upon installation.

The grounding strip 150 includes a series of ground connectors 158. Each ground connector 158 may be provided as a conductor, integrally formed with the grounding strip 150, which extends as a conductive loop perpendicularly from the grounding strip to permit a connection with a protection module ground connector 160 provided by the protection module 100 as will be described further below.

In the alternative the grounding strip 150 may be molded in place within the terminal block wherein each ground connector 158 protrudes from the housing 10 to permit each ground connector 158 to connect with each protection module ground connector 160.

A protection module retainer 140 is provided to secure the protection module 100 to the housing 10 proximate the test ports 18. The protection module retainer 140 is composed of a dielectric material, suitable for manufacture in the desired shape. For example, any one of several commercially available thermoplastic resins may be readily employed due to their relatively low cost and ease of manufacture. The protection module retainer 140 is provided with a series of retaining cups 142. Each retaining cup may be integrally formed with the protection module retainer 140 to form three horizontal walls. The side of the housing 10 provides a fourth wall, forming a four-walled cup, once the protection module retainer has been secured to the side of the housing 10. In order to provide a form-fit to the side of the housing 10, the protection module retainer 140 is provided with a longitudinal cut-out 146. The longitudinal cut-out 146 is formed to retain the ground strip 150 between the outer wall of the housing 10 proximate the test ports 18 and the cut-out of the retainer 142.

In order to properly align the protection module retainer 140 and secure the protection module retainer to the housing 10, the protection module retainer may be provided with bolt through holes formed in bosses. The bosses of the protection module retainer 140 are adapted to receive the housing bosses 154 during installation. Similarly, the ground strip 150 is adapted to be aligned with the housing bosses 154. The bosses of the protection module retainer 140 are secured to the housing bosses 154 by bolts 152. During installation of the protection module retainer 140, the ground strip 150 is aligned by the housing bosses 154 and retained between the protection module retainer 140 and the housing 10.

In the alternative, the protection module retainer may be integrally formed with the housing 10 and ground strip 150 during manufacture.

Once secured to the housing 10, each retaining cup 142 is adapted to receive a protection module 100 in a friction fit such that a protection module 100 may be easily inserted or removed therefrom. Upon insertion, the retaining cup 142 provides support for the protection module 100. The housing bosses 154 and the retainer mounting bosses 148 provide a substantial mass to support the retainer 140 on the side of the housing 10 during protection module 100 insertion and removal. In addition, through the mounting bosses, the retainer 140 ensures the protection module 100 is properly aligned with the test ports 18 and the ground connector 158 of the grounding strip 150. The friction fit provided by the retaining cup 142 securely retains a protection module 100 against the dynamic environment where telecommunications terminal blocks are typically employed.

The protection module 100 is provided with a protection module ground connector 160 and terminal block contact elements 110 which provide a conductive path between each test port 18 and the protection module 100 as will be described further below.

Figure 3:
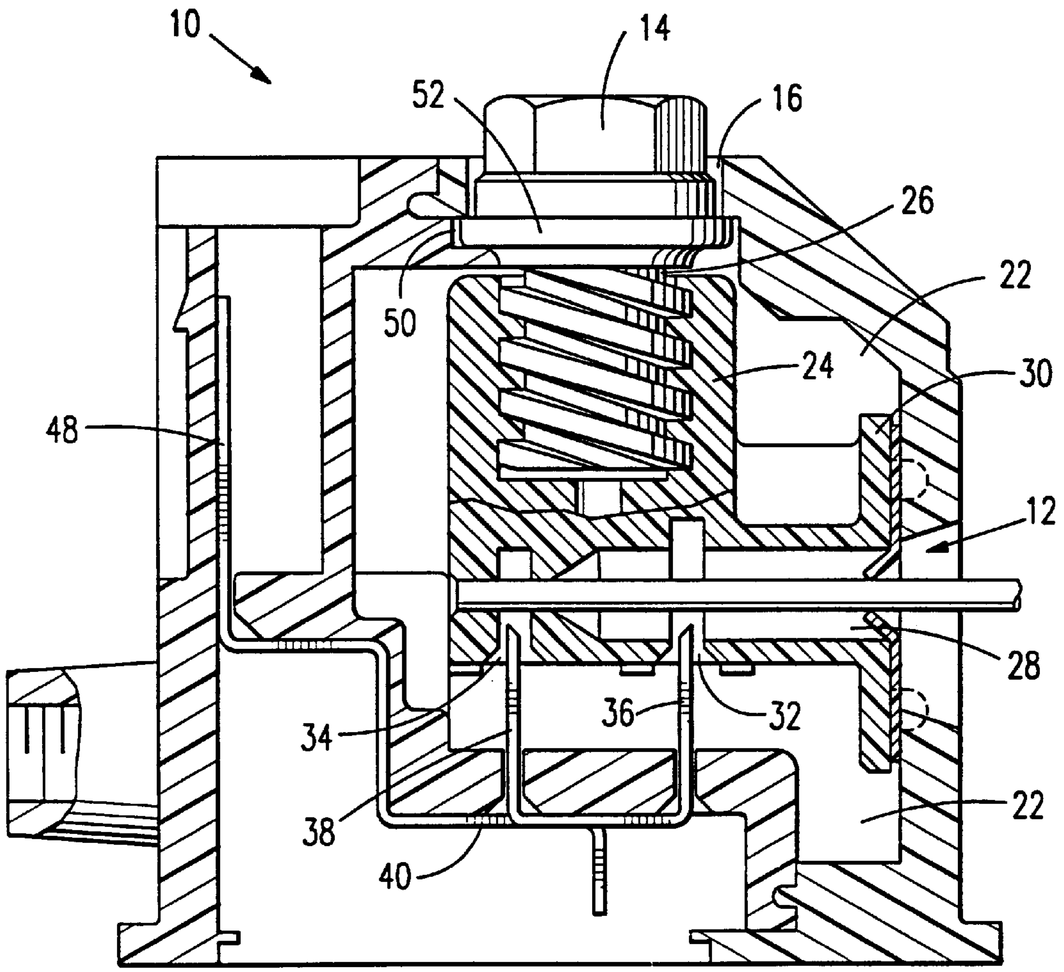
FIG. 3 is a side view taken along line 3—3 of FIG. 2 showing a cross-section of a preferred embodiment of the terminal block of the present invention before the service wires are connected to the IDC connectors.
Figure 4:
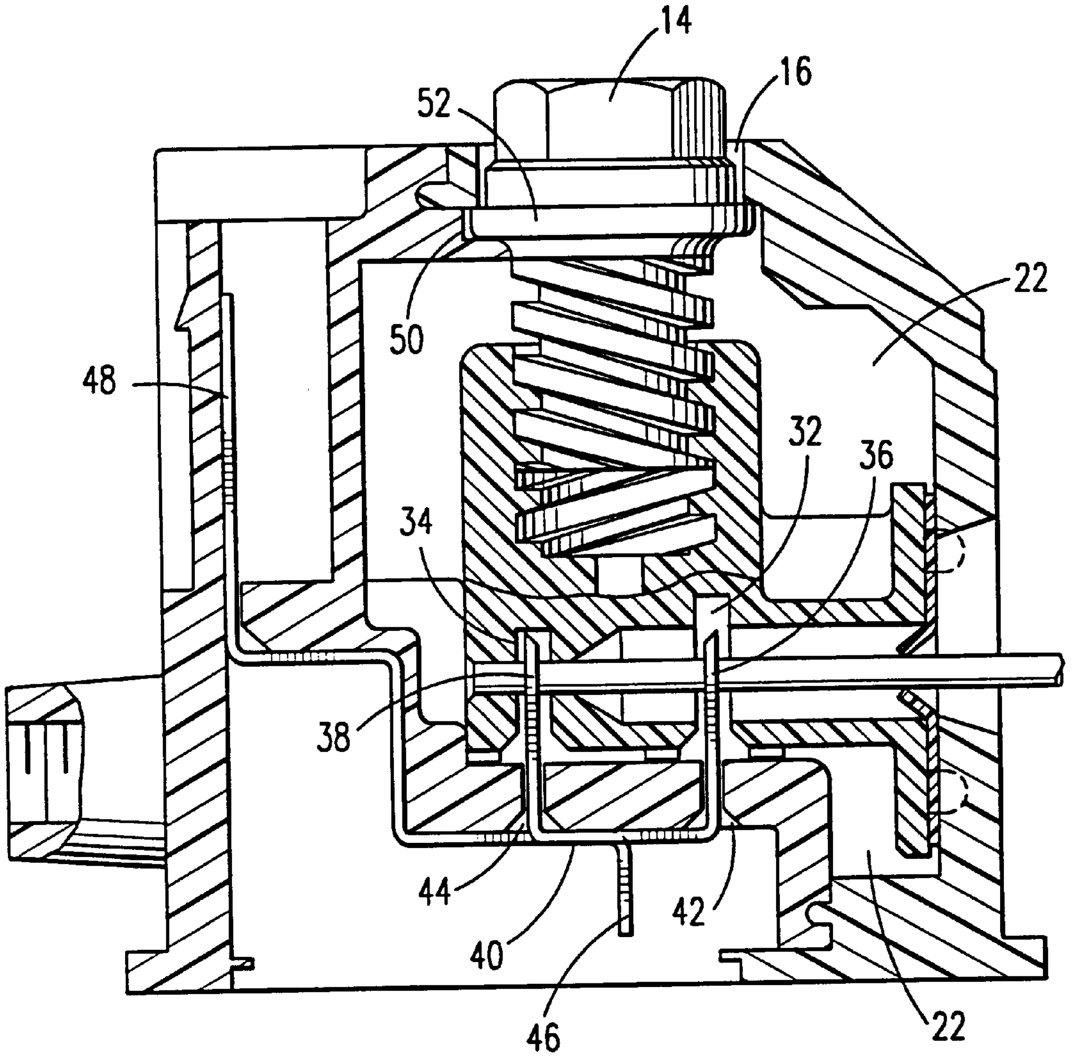
FIG. 4 is a the same view as in FIG. 3 showing a cross-section of a preferred embodiment of the terminal block of the present invention, but after the service wires are connected to the IDC connectors.

Referring to FIGS. 3 and 4, a partially broken away cross-sectional view taken along lines 3—3 in FIG. 2 is shown illustrating the interior of a single chamber of the terminal block. Since telephone lines employ pairs of conductors, the terminal block will in general have one or more pairs of contacts, etc. In the following discussion, however, connection of single wires will be referred to for simplicity.

As illustrated, each internal chamber 22 is preferably integrally formed with the tops and sides of the housing 10. The opening 16 which receives the terminal actuator 14 and the wire access slot 12 thus provides direct access into the chamber 22 from outside the housing 10. Positioned within each chamber 22 and threadedly engaged with the terminal actuator 14 is a wire carrier member 24. More particularly, the carrier member 24 has a threaded opening 26 in the top end thereof for receiving the matching size threaded end of terminal actuator 14. Wire carrier member 24 also has a wire receiving opening 28 for receiving a service wire inserted into the chamber through the wire access slot 12. The wire access opening 28 extends through a flanged extension 30 of the wire carrier 24 into the central portion of the carrier 24. A first contact blade receiving slot 32 is provided in the carrier at a first position along the wire access opening 28 and a second contact blade receiving slot 34 is provided at a second inner position of the wire access opening 28.

The first and second contact blade receiving slots 32, 34, respectively, receive first and second insulation cutting contact blades 36, 38, when the wire carrier member 24 is in the closed position illustrated in FIG. 4. The insulation cutting blades 36, 38 extend up from a double L-shaped contact element 40 which is configured outside the chamber 22 and the contact blades 36, 38 extend into the chamber 22 through the slots 42, 44 in the bottom of the chamber 22. A stub cable contact element 46 in turn extends outside of the chamber 22 and provides a connection to the stub cable (not shown). The contact element 40, including the insulation cutting blades 36 and 38 and the stub cable contact element 46, is preferably made of a metallic conductor to provide good electrical contact to the service wires when the blades 36, 38 pierce the insulation thereof. Which of the two blades 36, 38 makes electrical contact to the wires is determined by the diameter of the wire. That is, whether the wire is inserted to the first slot 32 or the second slot 34 will depend on the wire diameter. For example, a large gauge wire will only proceed along the opening 28 far enough to reach the slot 32 and will thus make electrical contact with the blade 36. A smaller gauge wire in turn will reach to the second slot 34 and make contact with the second, longer blade 38.

As shown in FIGS. 3 and 4, a test lead 48 is provided as part of the double L-shaped contact element 40. The test lead 48 extends into the test port 18. This allows ready electrical connection to the service wire by a test lead inserted into the test port 18. Although the test port 18 and the test lead 48 of the contact element 40 are shown in a separate test access opening sealed off from the chamber 22, they may be provided in an opening into the chamber 22.

As best illustrated in FIGS. 3 and 4, the top portion of the housing 10 over the chamber 22 is provided with an annular groove 50 around the opening 16. The top end of the terminal actuator 14 is provided with a matching annular flange 52 which fits within the annular groove 50. This thus prevents vertical motion of the terminal actuator 14 during rotation thereof.

In view of the foregoing structural description of the terminal block, its functional features may be readily appreciated in consideration with FIGS. 3 and 4.

Prior to use of the terminal block for service wire connection, and preferably during manufacture or assembly of the terminal block, a suitable insulating medium is injected into the chamber 22 so as to completely surround the carrier 24 and fill the wire opening 28 in the carrier 24. Any one of a large number of well known commercially available greases, gels and other insulating mediums may be employed, depending on the specific requirements of the application. The viscosity and adhesive qualities of the medium should be such that wire may be inserted to and removed from the opening 28 without adhering excessively to the medium and the medium should be sufficiently fluid so as to allow the carrier 24 to move therethrough. The medium may be injected into the chamber 22 through an opening extending through the actuator 14 into the chamber, which opening may be sealed by a small plug after the medium is in the chamber. Alternatively, the medium may be injected through the wire opening 28, test port 18 or during some intermediate assembly point in the manufacture of the terminal block. Also, the medium may be injected in a precured state or injected in an uncured state and subsequently allowed to cure.

In the field, the service wire desired to be connected to the stub cable (not shown) are inserted into opening 28 with the wire carrier 24 configured in a first position illustrated in FIG. 3. In this position, the wire may be readily inserted into the interior of wire carrier 24 displacing only a very moderate amount of insulating medium. As may be appreciated from FIG. 3, in the first position, the flanged extension 30 of carrier 24 blocks the portion of the wire access slot 12 below the opening 28 preventing outflow of the insulating medium therethrough. Once the wire has been inserted into the opening 28, the user of the terminal block rotates the terminal actuator 14 which in turn drives the wire carrier 24 downward due to the threaded engagement of actuator 14 and the wire carrier 24. The actuator 14 is rotated until the wire carrier 24 is driven down to the second position illustrated in FIG. 4. In this position, the wire has been forced into contact with the insulation cutting blades 36, 38. The insulation cutting blades 36, 38 slice through the insulation on the wire providing good electrical contact to the inner conductive core of the wire.

During the downward motion of the wire carrier 24, from the first position shown in FIG. 3 to the second position shown in FIG. 4, the insulating medium inside chamber 22 will flow around the sides of the wire carrier 24 so as to be displaced from the bottom to the top portion of the chamber 22. In this regard, vertical channels may be provided on the wire carrier 24 to facilitate the flow of the insulting medium around the wire carrier as it is driven from the first to second position by rotation of the actuator 14. Thus, despite the forcing down of the wire carrier 24 and the wire connected thereto, the volume of insulating medium in the chamber 22 remains substantially constant, avoiding the outflow of medium and/or the creation of any voids which could allow the entry of moisture or contaminants from the environment.

Figure 5:
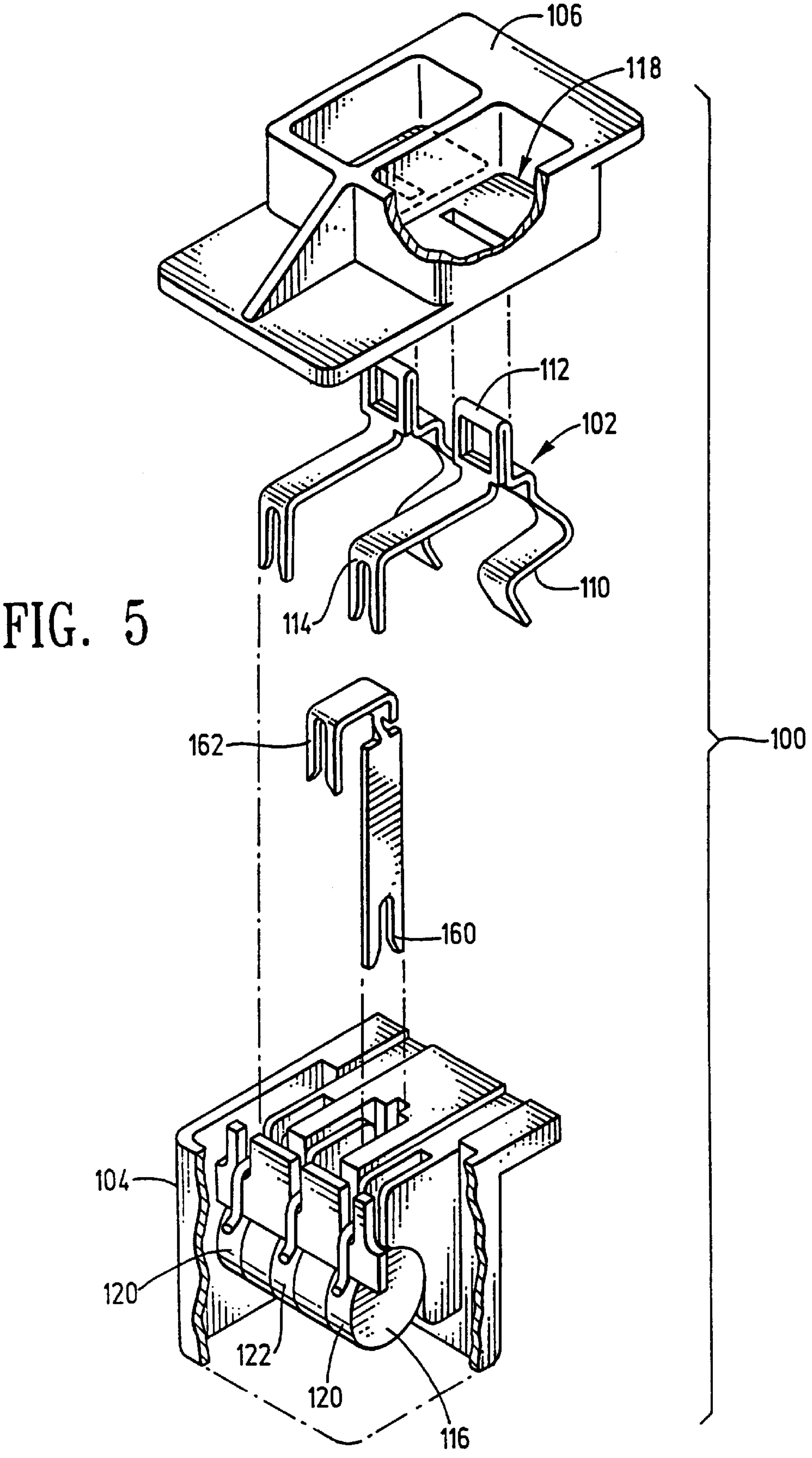
FIG. 5 is an exploded view of the basic components of the protection module of the present invention.

FIG. 5 illustrates an exploded view of the basic components of the protection module 100 of the present invention. The protection module 100 of the present invention provides protection for each of two wire connections between the exchange side and the service side. To simplify the description, and to avoid unnecessarily cluttering the drawings, only those components defining a single conductive path through the protection module 100 are described, although the detailed description applies equally to both conductive paths.

The protection module 100 is provided with a set of protection contact elements 102, a protector base 104, a protector cover 106, a protector 116, and a protection module ground connector 160. The protector base 104 is formed of a plastic material having similar properties as that of the protection module retainer 140 (as shown in FIG. 2). The protector base 104 provides an internal area sufficient to accept a protector 116, such as a twin gas discharge tube protector or other type of protector as will be described further below. The protector base 104 includes four walls which form a friction fit with a retaining cup 142 when inserted therein.

Figure 6:
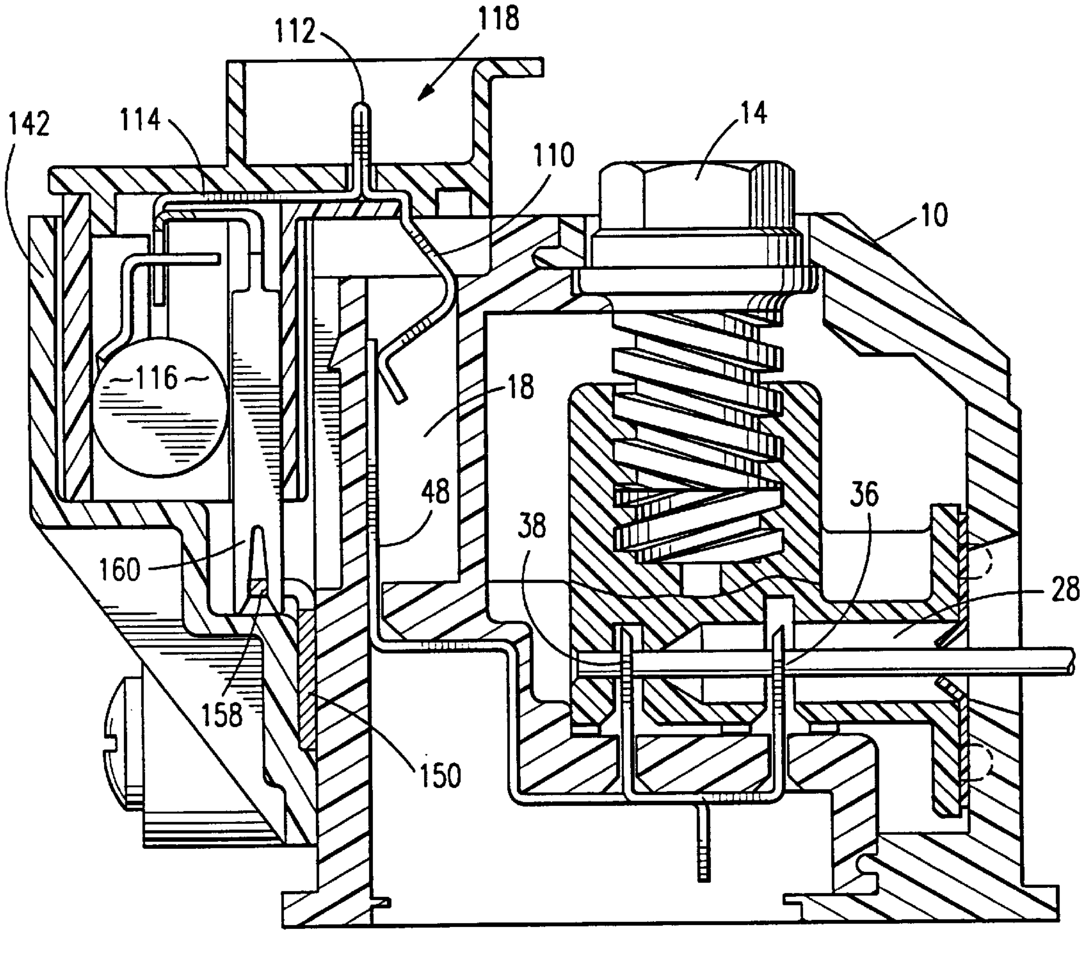
FIG. 6 is a cross-section of a preferred embodiment of the terminal block of the present invention with the protection module installed in the terminal block.

As illustrated in FIGS. 5 and 6, a protector 116 is provided within the housing base 104 of the protection module 100. The protector 116 may be provided as a gas discharge tube as shown in FIGS. 5 and 6 and as disclosed, for example, in U.S. Pat. No. 4,866,563, entitled "Transient Suppressor Device Assembly," herein incorporated by reference. A gas discharge tube has three conductive rings, a first ring 120 and a second ring 120 encircling the circumference of each of the ends of the tube and a third ring 122 encircling the middle of the tube. Each set of protection contact elements 102 are conductively connected to the end rings, respectively, and the protection module ground connector 160 is conductively connected to the middle ring. Among its many functions, the gas discharge tube and the protection module ground connector 160 perform in conjunction with protection contact elements 102 to shunt voltage to earth in the event there are voltage spikes on the conductive path, for example. Therefore, once the protector module 100 is properly inserted into a retaining cup 142, the two primary conductive paths through a wire pair connection of a terminal block are protected from intermittent destructive voltage levels. The use and operation of the gas discharge tube and its application in protecting signal lines in this manner are well known in the art.

In the alternative, the protector 116 may be provided as a gas discharge tube device modified to provide faster response to voltage surges. It is commonplace to encounter solid state protector devices, such as disclosed in U.S. Pat. No. 4,796,150, entitled "Telecommunication Protector Unit With Pivotal Surge Protector," herein incorporated by reference, in use in telecommunications systems. Such solid state devices may be increasingly sensitive to voltage surges and may be destroyed before a typical gas discharge tube has triggered its protection. In order to protect such equipment, the protector 116 may be provided as a hybrid device including a gas discharge tube in combination with faster-response solid state discrete components capable of grounding voltages to earth faster than typical gas discharge tubes. In the alternative, the protector 116 may be provided as a solid state device which provides the necessary voltage protection and response time.

The protector 116 within the protection module 100, is connected to ground by connecting the third ring 122 to a protector contact 162 which is integrally formed with the protection module ground connector 160 from a metallic electrical conductor. When the protection module 100 is inserted into a retaining cup 142, the ground connector 160 which extends through the base 104 of the protection module 100 mates with the grounding strip 150. As illustrated in FIG. 6, the ground connector 158 integrally formed with the grounding strip 150 is adapted to receive the ground connector 160 when the protection module 100 is snapped in place in a retaining cup 142. Therefore the ground connector 158 provides a ground connection between the grounding strip 150 and the third ring 122 of the protector 116.

Each protection contact element 102 is formed of a metallic, conductive material similar to that used in the contact element 40 shown in FIGS. 3 and 4. As illustrated in FIG. 5, each protection contact element 102 is provided with a plurality of bends forming a terminal block contact element 110, an external test contact element 112 and a protector contact element 114. The terminal block contact element 110, external test contact element 112 and protector contact element 114 are integrally formed to provide a continuous conductive path.

The terminal block contact element 110 may be provided in an S-shape as illustrated in FIGS. 5 and 6 to ensure a highly conductive path is established between the terminal block contact element 110 and the test lead 48 within the test port 18. The test port 18 is adapted to receive the terminal block contact element 110 such that the terminal block contact element 110 forms a compressive contact with the test lead 48. The protector contact element 114 is conductively secured to a first ring 120 of the protector 116 to provide the connection to the protector 116. As such, once the protection module 100 has been properly installed into the retaining cup 142, the protector 116 will be in conductive communication with the test lead 18.

The external test contact element 112 is established as a raised portion of the protection contact element 102 adapted to receive a test probe or test lead such as an alligator-type clip (not shown). Once the protection module 100 is installed into retaining cup 142, any signal available at the test lead 48 is available at the external test contact element 112.

As illustrated in FIG. 5, the protection module is provided with a cover 106. The cover is provided with a recessed slot through which may be provided the external test contact element 112. The recessed slot is surrounded by raised walls. The top of the cover 106 in combination with the raised walls provides a reservoir 118. The reservoir 118 may be filled with an insulating medium such as a grease or gel, which medium is sufficiently deformable to allow access of a test probe to test contact element 112.

The protector 116, the protection contacts 102 connected to the protector 116 and the protection module ground connector 160 may be maintained within the protection module 100 with a hard encapsulant such as a non-conductive epoxy. The hard encapsulant itself may also serve as the bottom surface of the protection module 100. The encapsulant provides an environmental seal which protects the contents of the protection module 100. Preferably, any interstitial space between the encapsulant and the cover 106, as well as the reservoir formed on the top surface of the cover, is filled with an insulating media which further protects the contents of the protection module 100 from the environment.

In view of the foregoing structural description of the protection module, its functional features may be readily appreciated in consideration with FIG. 6. In the field, the service wire desired to be connected to the stub cable is inserted into opening 28 of the housing 10 and terminated by the actuator 14. When actuation is complete, the insulation displacement blades 36, 38 are in conductive contact with the service wire. This creates a single conductive path between the service and exchange sides by terminating the service wire to the stub cable contact element 46. Moreover, the test lead 48 extending into test port 18 carries the signal from the conductive path termination to the test port 18.

A technician may add voltage surge protection to the conductive path by securing a grounding strip 150 and a protection module retainer 140 to the housing 10. A protection module 100 may be inserted into a retainer cup 142 corresponding to the conductive path to be protected. When the protection module 100 is installed into the retainer cup 142, the protection module ground connector 160 engages the ground connector 158 of the ground strip 150, providing a conductive path between the third ring 122 encircling the middle of the protector 116 and earth. During installation, the terminal block contact element 110 engages the test lead 48 to form a conductive path between the test lead and the first or the second end rings 120 encircling the circumference of the end of the gas discharge tube.

When a voltage surge occurs, for example, the open circuit between the third ring 122 and the first ring 120 closes and the voltage surge is shunted to earth, thus protecting the telecommunications equipment conductively connected to the conductive path. Once a voltage surge has occurred, forcing the protector 116 to connect to earth, the protector may be replaced by lifting it from the retaining cup 142 and replacing it with a functioning protection module 100. The replacement occurs without disrupting the termination between the exchange side and the service side.

Accordingly, it will be appreciated that the protection module and retainer of the present invention provides significantly improved protection against voltage surges and allows a protection module to be added to or removed from the retaining cup 142 without affecting the exchange wire or service wire terminations. In addition, providing protection on an as-needed basis ensures the additional cost of protection is limited to those conductive paths needing protection. Finally, the retainer provides the needed alignment and support needed to repeatedly install and remove a protection module from a terminal block while securely retaining the protection module. Furthermore, the present invention provides a protection module which is simple to use, easy to fabricate, and not prone to failure even after repeated connections and reconnections.

While the foregoing description has been of a presently preferred embodiment of the present invention, it should be appreciated that the protection module of the present invention may be modified in a wide variety of ways while still remaining within the spirit and scope of the present invention. For example, the specific configurations of the retaining cups and the protection module may all be varied due to specific manufacturing considerations or other reasons without departing from the spirit and scope of the present invention. For example, the retaining cups and the grounding strip may be integrally formed with the terminal block housing. Moreover, the protector may be provided as a solid state protection device to provide enhanced speed and range of protection. Furthermore, while the present invention has been described as a terminal block adapted for use with an insulated wire, the present invention may equally well be employed with a bare wire.

Additional variations and modifications of the preferred embodiment described above may also be made as will be appreciated by those skilled in the art and accordingly the above description of the present invention is only illustrative in nature. The invention is further defined by the following claims.

What is claimed is:

1. A protected terminal block adapted for use in connecting an exchange wire and one or more service wires, the protected terminal block comprising:

a housing having an access hole for allowing a wire to be inserted into said housing;

an electrical contact element configured in said housing and conductively connected to an exchange wire, said electrical contact element having a test lead;

a test port in said housing for providing access to said test lead;

means configured within the housing, for electrically connecting a service wire to said contact element;

a ground contact coupled to said housing adjacent said test port;

a receptacle coupled to the housing and configured adjacent said test port; and means, removably mounted in the receptacle and extending into the test port, for protecting a selected electrical conductive path, connected to said ground contact and said test lead, wherein said connections between said protecting means, and said ground contact and said test lead, are automatically achieved upon insertion of said protecting means into said receptacle.

2. A protected terminal block as set out in claim 1, further comprising a chamber within said housing, and wherein said means for electrically connecting a service wire to said contact element comprises:

a wire carrier member configured in said housing, said wire carrier member having an opening for receiving a wire inserted through said access hole and being movable within said housing so as to move a service wire engaged thereby into contact with said electrical contact element to form an electrically conductive path; and an actuator mechanism, coupled to said wire carrier member and adapted to move said wire carrier member within said housing and relative to said actuator mechanism in a manner such that the actuator mechanism does not change its degree of entry into the housing.

3. A protected terminal block as set out in claim 2, wherein said electrical contact element is a metal element configured outside the chamber having a test lead extending into said test port, and a pair of slotted insulation cutting blades extending into said chamber toward said wire carrier member.

4. A protected terminal block as set out in claim 2, wherein said chamber is adapted to receive an electrically insulating medium and said wire carrier member is provided with means for allowing said electrically insulating medium to flow around said wire carrier member as it is moved within said chamber by said actuator mechanism.

5. A terminal block as set out in claim 1, wherein said means for protecting comprises a protection module having a protector, said protector having a terminal block contact element and a ground connector conductively connected thereto, and wherein said receptacle is a protection module retainer secured to a side of said housing proximate said test port to form a retaining cup, and wherein said protection module is removably retained within said retaining cup.

6. A protected terminal block as set out in claim 5, wherein said ground contact comprises a grounding strip conductively secured to ground and retained between said protection module retainer and said housing proximate said test port, said grounding strip having integrally formed therein a ground connector.

7. A protected terminal block as set out in claim 6, wherein said terminal block contact element conductively engages said test lead in said test port and said protection module ground connector conductively engages said grounding strip ground connector to protect said selected electrically conductive path.

8. A protected terminal block as set out in claim 5, wherein said protector comprises a gas discharge tube protector.

9. A protected terminal block as set out in claim 5, wherein said protector comprises a hybrid solid state and gas discharge tube protector.

10. A protected terminal block as set out in claim 5, wherein said protector comprises a solid state protector.

11. A protected terminal block as set out in claim 1, wherein said ground contact is removably coupled to said housing and said receptacle is removably coupled to said housing, wherein said receptacle and said ground contact may be removed from said housing.

12. A protected terminal block as set out in claim 1, further comprising a pair of housing bosses, on said housing, wherein said housing bosses cooperate with a pair of bolts to secure both said receptacle and said ground contact to said housing.

13. A method for protecting a multi-wire terminal block having a housing with a plurality of separate chambers, a plurality of holes for allowing service wire pairs to be inserted into said chambers, and a test port having a test lead connected to a conductive path between the service wire and an exchange wire, the housing adapted to accept a removable ground strip and a removable protection module retainer, proximate said test port to form a plurality of retaining cups adapted to removably receive a protection module the method comprising:

inserting a protection module having a protector with a terminal block contact element and a protection module ground connector within a selected retaining cup corresponding to a selected electrically conductive path to be protected so as to form an electrically conductive connection between said terminal block contact element and said test lead, and to form an electrically conductive connection between said protection module ground connector and said ground strip, wherein said electrically conductive connections between said terminal block contact element and said test lead, and between said protection module ground connector and said ground strip, are automatically achieved upon inserting said protection module into said selected retaining cup.

14. A protected multi-wire terminal block adapted for use in connecting an exchange wire and one or more service wires, the protected terminal block comprising:

a housing having a plurality of separate chambers and a plurality of access holes for allowing service wire pairs to be inserted into said chambers;

a plurality of electrical contact elements, respectively configured in each of said plurality of separate chambers and conductively connected to an exchange wire;

means configured within the housing, for electrically connecting each respective service wire to an electrical contact element;

a ground contact removably secured to said housing adjacent a test port;

a plurality of receptacles removably secured to said housing and configured adjacent said test port, wherein said plurality of receptacles and said ground contact may be removed from said housing; and means, removably mounted in a selected receptacle and conductively connected to said ground contact and a selected contact element, for providing electrical surge protection, wherein a protected electrical path is provided between said service wire, said selected electrical contact element and said exchange wire, wherein said connections between said protection means, and said ground contact and said selected contact element, are automatically achieved upon insertion of said protection means into said selected receptacle.

15. A protected multi-wire terminal block as set out in claim 14, wherein said electrical contact element has an insulation displacement connector, and wherein said means for electrically connecting a service wire to a contact element comprises:

a wire carrier member configured in said chamber, said wire carrier member having an opening for receiving a wire inserted through said access hole and being movable within said chamber so as to move a service wire engaged thereby into contact with said insulation displacement connector to form an electrically conductive path; and an actuator mechanism, coupled to said wire carrier member and adapted to move said wire carrier member within said chamber and relative to said actuator mechanism in a manner such that the actuator mechanism does not change its degree of entry into the chamber.

16. A protected terminal block adapted for use in connecting a pair of exchange wires and a pair of service wires, the protected terminal block comprising:

a housing having a pair of access holes for allowing a pair of service wires to be inserted into said housing;

a pair of electrical contact elements configured in said housing and conductively connected to a pair of exchange wires, said pair of electrical contact elements having a corresponding pair of test leads;

a pair of test ports in said housing for providing access to said pair of test leads;

means configured within the housing, for electrically connecting said pair of service wires to said pair of contact elements;

a ground contact secured to said housing adjacent said pair of test ports;

a receptacle coupled to the housing and configured adjacent said pair of test ports; and a protection module for protecting a pair of electrically conductive paths removably mounted in said receptacle, said protection module having a protector with a pair of terminal block contact elements and a protection module ground connector, wherein said pair of terminal block contact elements extends into said pair of test ports to form an electrically conductive connection between said pair of terminal block contact elements and said pair of test leads within said pair of test ports, and wherein said protection module ground connector forms an electrically conductive connection with said ground contact, wherein said electrically conductive connections between said terminal block contact elements and said pair of test leads, and said protection module ground connector and said ground contact, are automatically achieved upon insertion of said protection module into said receptacle.

17. A terminal block for use in connecting telecommunication service wires to exchange wires, the terminal block comprising:

a housing including a plurality of service wire to exchange wire terminating means therein;

a pair of receptacles connected to the housing; and one or more removable protection modules which are adapted to removably fit within the receptacles, each protection module including:

an electrical surge protection means, one or more test contacts, a first electrical contact which is automatically electrically connected to the service to exchange wire terminating means upon insertion of the module into a receptacle, and a ground contact which is automatically connected to a path to an electrical ground when the module is inserted into a corresponding receptacle, wherein when a protection module is fitted within a receptacle the one or more test contacts allow a corresponding service wire to exchange wire terminating means to be individually electrically tested.

18. A terminal block as set out in claim 17, wherein each of the protection modules includes at least one test port at the top thereof and wherein the one or more test contacts are positioned to be accessible via the at least one port.

19. A terminal block as set out in claim 17, wherein said housing includes a plurality of chambers and wherein said terminating means are configured within said chambers.

20. A terminal block as set out in claim 19, wherein said housing further comprises a plurality of test ports having electrical test leads connected to respective service to exchange wire terminating means and wherein said first electrical contact of each protection module mates with the test leads in a test port when the protection module is inserted into a corresponding receptacle.

21. A terminal block as set out in claim 17, wherein the plurality of receptacles are formed in an integral unit which is rigidly attached to the housing.

* * * * *